United States Patent
Rosso et al.

(10) Patent No.: US 11,566,601 B2
(45) Date of Patent: Jan. 31, 2023

(54) DEVICE AND METHOD FOR ANGLE STABILIZATION OF A VIRTUAL SYNCHRONOUS MACHINE

(71) Applicant: Wobben Properties GmbH, Aurich (DE)

(72) Inventors: Roberto Rosso, Aurich (DE); Sönke Engelken, Bremen (DE); Marco Liserre, Kiel (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/108,846

(22) Filed: Dec. 1, 2020

(65) Prior Publication Data

US 2021/0172418 A1    Jun. 10, 2021

(30) Foreign Application Priority Data

Dec. 10, 2019    (DE) .......................... 102019133813.1

(51) Int. Cl.
| | |
|---|---|
| *F03D 7/02* | (2006.01) |
| *F03D 9/25* | (2016.01) |
| *G05F 1/66* | (2006.01) |
| *H02P 101/15* | (2016.01) |

(52) U.S. Cl.
CPC .............. *F03D 7/028* (2013.01); *F03D 9/25* (2016.05); *G05F 1/66* (2013.01); *G05B 2219/41294* (2013.01); *H02J 2300/28* (2020.01); *H02P 2101/15* (2015.01)

(58) Field of Classification Search
None
See application file for complete search history.

(56) References Cited

U.S. PATENT DOCUMENTS

| | | | |
|---|---|---|---|
| 10,416,028 B2 | 9/2019 | Doppelhammer et al. | |
| 10,452,091 B2 | 10/2019 | Rahmani et al. | |
| 2012/0292904 A1* | 11/2012 | Tarnowski | H02J 3/381 |
| | | | 290/44 |
| 2016/0215759 A1* | 7/2016 | Fleming | F03D 7/048 |
| 2017/0009745 A1* | 1/2017 | Brogan | F03D 7/00 |

(Continued)

FOREIGN PATENT DOCUMENTS

| | | |
|---|---|---|
| AT | 518194 A1 | 8/2017 |
| CN | 110429659 A | 11/2019 |
| EP | 3208907 | 9/2018 |

OTHER PUBLICATIONS

Choopani et al., "New Transient Stability and LVRT Improvement of Multi-VSG Grids Using the Frequency of the Center of Inertia," *IEEE Transactions on Power Systems*, 35(1): 527-538, Jan. 2020.

(Continued)

*Primary Examiner* — Nathan L Laughlin
(74) *Attorney, Agent, or Firm* — Seed IP Law Group LLP

(57) ABSTRACT

Provided is a control circuit of a converter, in particular a power converter of a wind power installation, configured to control the converter in such a way that the converter emulates a behavior of a synchronous machine. The control circuit includes a power module for calculating a power change depending on a detected power and a correction module for setting a power set point, in particular for the converter, depending on the calculated power change.

16 Claims, 5 Drawing Sheets

(56) References Cited

U.S. PATENT DOCUMENTS

2018/0269819 A1\* 9/2018 Tuckey .................... H02P 9/14
2019/0024634 A1   1/2019 Tarnowski
2019/0103743 A1\* 4/2019 Sun ..................... H02J 13/0086

OTHER PUBLICATIONS

Mehrasa et al., "Angular Frequency Dynamic-Based Control Technique of a Grid-Interfaced Converter Emulated by a Synchronous Generator," in *2018 International Conference on Smart Energy Systems and Technologies (SEST)*—IEEE, Ei Compendex & SOPUS, Sevilla, Spain, Sep. 10-12, 2018, pp. 1-5.

Shuai et al., "Transient Angle Stability of Virtual Synchronous Generators Using Lyapunov's Direct Method," *IEEE Transactions on Smart Grid*, 10(4): 4648-4661, Jul. 2019.

Rosso et al., "Robust Stability Analysis Of LCL Filter Based Synchronverter Under Different Grid Conditions," IEEE Transactions on Power Electronics, vol. 34, No. 6, Jun. 2019, pp. 5842-5853.

\* cited by examiner

DEVICE AND METHOD FOR ANGLE STABILIZATION OF A VIRTUAL SYNCHRONOUS MACHINE

BACKGROUND

Technical Field

The present invention relates to a control module (control circuit or control stage) of a converter, in particular a power converter of a wind power installation, which is set up to control the converter in such a way that the converter emulates a behavior of a synchronous machine. The present invention further relates to a control unit (controller) which has a control module of this type, a converter which has a control module of this type as well as a method for controlling the converter and a wind power installation which has a control module of this type and/or carries out a method of this type.

Description of the Related Art

Owing to the increasing displacement of conventional synchronous generator driven power plants by regenerative, converter-based generators, classical synchronous generators are losing more and more influence within the electrical supply network.

This decline in synchronous generators also results in a reduction in conventional flywheel masses which stabilize the electrical supply network.

Since the effects of a change of this type within the electrical supply network are virtually unexplored, there are some considerations to operate the converters of the regenerative generators in such a way that they operate like a synchronous machine on the electrical supply network. In other words, the converters should emulate the behavior of a synchronous machine, without losing the benefits of power converter technology. Converters which are operated in this manner are also referred to as virtual synchronous machines.

In recent years, a wide variety of control methods have been proposed for synchronous machine emulations for this purpose.

Some of these methods, as shown in R. Rosso, J. Cassoli, G. Buticchi, S. Engelken, and M. Liserre, "Robust stability analysis of LCL filter based synchronverter under different grid conditions," IEEE Trans. Power Electron., 2018, doi: 10.11 09/TPEL.2018.2867040, for example, even have advantages over standard established converter control methods, in particular on so called weak networks.

A disadvantage of the previously known methods for emulating a synchronous machine by means of a converter is that they are not designed for any network errors which occur in the electrical supply network.

BRIEF SUMMARY

A control method for controlling network errors for virtual synchronous machines is provided preferably in order to continue to be able to reproduce the characteristics of an actual synchronous machine even in the case of a network error and under the constraints of the hardware characteristics of the converter. In particular, a method shall be proposed which identifies a critical state with regard to angular stability and allows appropriate measures to be taken.

A control module of a converter, in particular a power converter of a wind power installation, is thus proposed which is set up to control the converter in such a way that the converter emulates a behavior of a synchronous machine, at least comprising: a power module (circuit) for calculating a power change depending on a detected power and a correction module (circuit) for setting a power set point, in particular for the converter, depending on the calculated power change.

The control module is set up in particular by means of the power module and the correction module to identify a possible loss of angular stability of the converter with regard to the electrical supply network.

The converter is a converter of a wind power installation or a photovoltaic installation, for example. The converter is preferably a power converter, i.e., a converter which is set up and used to feed electrical power into the electrical supply network. For this purpose, the converter preferably has at least one DC link voltage of at least 400V, further preferably of at least 690V, in particular of at least 1000V.

The converter is therefore preferably designed as a power converter of a wind power installation.

The converter itself is preferably controlled via a control unit which comprises the control module described previously or hereinafter and/or is controlled as described hereinafter.

The control module itself therefore has at least one power module and a correction module.

The power module is set up to calculate a power change depending on a detected power. The detected power is preferably the electrical power which is emitted from the converter, in particular to the electrical supply network. The power emitted from the converter can be detected or determined by means of a power detection at the output of the converter, for example. For this purpose, the power detection itself can be a component of the control unit of the converter or the control module, for example.

The power change can further be determined over time by means of a plurality of measurements, for example, i.e., a first measurement at a first point in time and a second measurement at a second point in time, for example. A difference can then be formed from these two values recorded in this way, which difference specifies the power change.

The power change is preferably determined by means of a discrete implementation of the derivative of the measured or detected power, preferably using a cascaded discrete filtering.

Alternatively, the power change is determined by means of an observer which acts on the difference between the measured power and an estimated power by way of a PI controller, for example.

The correction module is further set up to set a power set point or to output a power set point, in particular in order to set the power set point for the converter. In this case, the power set point or the correction value for the power set point is determined depending on the calculated power change.

The correction module preferably additionally has a threshold value and only establishes a power set point for the converter if the power change has exceeded a predetermined threshold value.

The correction module can additionally have further sub-modules and/or further modules are provided which are set up to change and/or specify a power set point by means of a proportional coefficient or a limitation to a fixed value, for example.

It has indeed been recognized that if the power change exceeds a certain amount, in particular is negative, i.e., is dP/dt<0, an angular instability can be present. In order to verify the presence of an angular instability, the acceleration of the virtual pole wheel is preferably taken as a basis, in particular if this acceleration is positive, i.e., dδ/dt>0, an angular instability or an imminent loss of stability can be assumed. In particular, an angular instability could be present if the product of these two coefficients exceeds or falls below a certain limit. In such a case, the correction module therefore intervenes in the control of the converter, in order to specify a new power set point, in particular a more stable power set point, for the converter.

It is therefore also proposed that the control module only intervenes in the control of the converter after certain power changes, in particular via the correction module.

The control module preferably further comprises a power angle module for calculating a power angle change depending on at least one detected frequency, wherein the power set point is also set depending on the power angle change.

The control module therefore also has a power angle module.

In this case, the power angle module is set up to determine a power angle change depending on at least one detected frequency.

The detected frequency can be a mechanical or an electrical frequency, for example. At least one frequency of the virtual synchronous machine and the frequency of the electrical supply network are preferably detected.

The power angle change is therefore used, in precisely the same manner as the power change, to determine the power set point for the converter.

For this purpose, the power change dP/dt and the power angle change dδ/dt are preferably multiplied together.

In particular, it is therefore proposed that a coefficient is calculated which has the same sign as the synchronizing power coefficient. This is due to the fact that the sign of the synchronizing power coefficient per se is already an indicator of a possible angular instability. The proposed solution therefore has the advantage that a division by zero can be avoided. The fact should also be emphasized here that the coefficient dδ/dt is limited by a saturation block of [0, +∞] so that the situation dP/dt>0 and dδ/dt<0 (the product of which also has a negative sign) is not identified as a critical state.

The control module preferably further comprises a multiplication by means of which the power change and the power angle change are combined to form one product or coefficient, wherein the power set point is also set depending on the coefficient.

The power change and the power angle change are thus multiplied to form one product which is used as a coefficient, in particular in order to set the power set point for the converter.

In particular, it is therefore proposed to generate a coefficient by means of a multiplication, which coefficient is indicative of the angular stability or indicates an imminent loss of angular stability.

The power set point, in particular of the converter, is then preferably set depending on this coefficient.

If a multiplication of this type is used which multiplies the power angle change by the power change, it is also proposed that the correction module has or comprises a corresponding threshold value for this product.

The power module preferably has at least one discrete implementation of a derivative of the detected power.

In particular, this means that the power module is set up to determine the power change with respect to time, i.e., in particular as a differential dP/dt.

For this purpose, the power module preferably has at least one discrete filtering which is downstream of the discrete implementation of the derivative of the detected power, in order to determine the power change.

In particular, a discrete implementation of the derivative of the measured power is therefore also proposed for determining the power change, which implementation cooperates with an additional cascaded discrete filtering.

Alternatively, the power module has at least one observer which determines the power change dP/dt.

This can take place by way of a PI controller, for example, which acts on the difference between a measured or detected power and an estimated power and calculates a state variable $dP_{dt}$ as a result.

The observer preferably acts on a difference between the detected power and an estimated power, in particular estimated by the observer, by way of a PI controller.

The power angle module preferably has at least one summation which is set up to compare at least one first electrical frequency with a second electrical frequency.

The summation preferably forms a difference from the electrical frequency of the virtual synchronous machine and the electrical frequency of the electrical supply network.

In particular, it is therefore proposed to take into account both the electrical frequency of the virtual synchronous machine and the electrical frequency of the electrical supply network, in particular in order to calculate a frequency difference, namely the electrical frequency of the virtual synchronous machine minus the electrical frequency of the electrical supply network.

The power angle module preferably has at least one limiter which is set up to limit the frequency difference to positive values.

In particular, it is therefore proposed to only consider positive values with regard to the power angle change.

For this purpose, the power angle change is guided via a saturation block or is limited to exclusively positive values.

If negative values are therefore present, a zero is output by the limiter or saturation block which results in the product of the power angle change and power change also being zero, whereby the threshold value of the correction module is not exceeded and the set points thus do not change, in particular because there is a stable operation.

In particular, it is therefore also proposed that only the situations in which the power angle δ accelerates and the power P decreases are identified as a critical state.

The correction module is preferably set up to only set the power set point if a predetermined threshold value is exceeded, in particular if the coefficient exceeds the predetermined threshold value.

In particular, it is therefore also proposed that the control module only intervenes in the control of the converter if there is a risk of angular instability.

An angular instability is preferably always present if the angle accelerates, i.e., the angle change is positive, and the power decreases, i.e., the power change is negative.

As soon as a critical state is identified, the proposed measure is to adjust the power set points, in particular of the converter, to a lower value. This change preferably causes a reduction in the power angle δ and prevents unstable operation of the converter.

A control unit of a converter is further proposed, in particular a power converter of a wind power installation, comprising a control module described previously or hereinafter.

In this case, the control unit is in particular set up to generate current set points, by means of which the converter is controlled, for example by means of a tolerance band method.

A method for controlling a converter is further proposed, in particular a power converter of a wind power installation, wherein the converter is set up to emulate the behavior of a synchronous machine, comprising the steps: detecting a power at the output of the converter, calculating a power change depending on the detected power and setting a power set point, in particular for the converter, depending on the calculated power change.

In particular, the method therefore makes provision for controlling a converter, which is set up to emulate the behavior of a synchronous machine, depending on a calculated power change.

In this case, the method is in particular additionally used for control and is used in particular to reduce the power output of the converter in critical cases, i.e., in particular if there is a risk of loss of angular stability.

The method preferably further comprises the step: calculating a power angle change depending on at least one detected frequency, wherein the power set point is also set depending on the power angle change.

The method preferably further comprises the step: multiplying the power change and the power angle change to a coefficient or product, wherein the power set point is also set depending on the coefficient.

In particular, it is therefore also proposed that both the power change and the power angle change are considered for controlling the converter.

The power angle change is preferably determined at least by comparing a first electrical frequency with a second electrical frequency.

In particular, this takes place as described previously or hereinafter.

A converter is further proposed, in particular a power converter of a wind power installation, comprising at least one control unit, in particular comprising a control module described previously or hereinafter, wherein the control unit is set up to control the converter in such a way that the converter emulates at least one behavior of a synchronous machine and/or carries out a method described previously or hereinafter.

The converter preferably comprises a control unit of a virtual synchronous machine, in particular as described previously or hereinafter.

A wind power installation is further proposed, comprising a control module described previously or hereinafter and/or a control unit described previously or hereinafter and/or a converter described previously or hereinafter and/or a control unit of a converter which is set up to carry out a method described previously or hereinafter.

BRIEF DESCRIPTION OF THE SEVERAL VIEWS OF THE DRAWINGS

The present invention is explained in greater detail hereinafter in an exemplary manner using exemplary embodiments with reference to the accompanying figures, wherein the same reference numbers are used for the same or similar components.

DETAILED DESCRIPTION

Figure 1A:
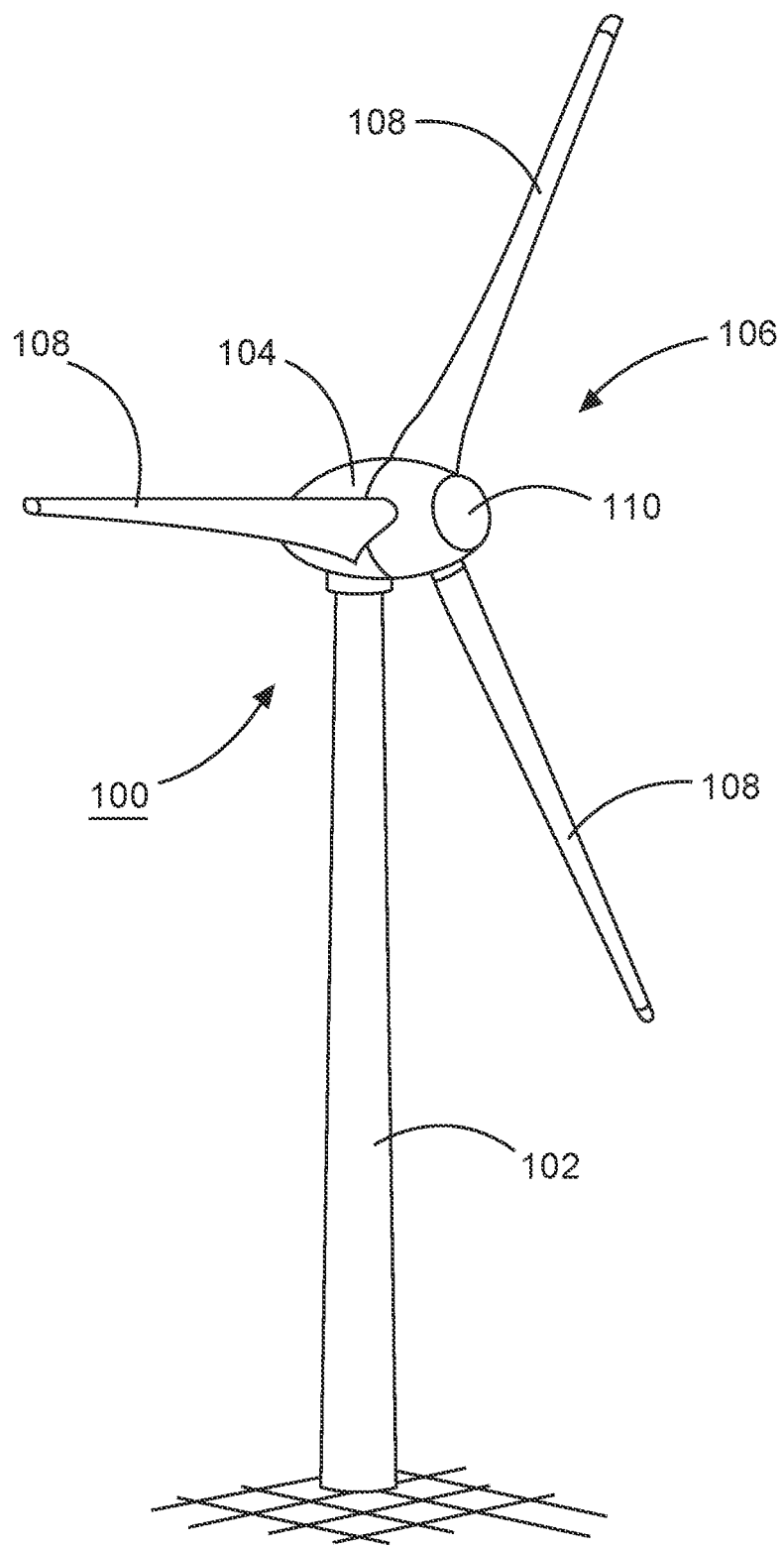
FIG. 1A shows a schematic view of a wind power installation according to an embodiment.

FIG. 1A shows a schematic view of a wind power installation 100 according to an embodiment.

The wind power installation 100 comprises a tower 102 and a nacelle 104. An aerodynamic rotor 106 with three rotor blades 108 and a spinner 110 is arranged on the nacelle 104. The rotor 106 is transferred into a rotational movement by the wind during operation and thus drives a generator in the nacelle 104.

The generator is connected to an electrical network, for example a wind park network or an electrical supply network, by means of a converter, in order to feed in a three-phase alternating current.

For this purpose, the wind power installation comprises a control module (circuit) described previously or hereinafter and/or a control unit described previously or hereinafter and/or a converter described previously or hereinafter and/or a control unit of a converter which is set up to carry out a method described previously or hereinafter.

Figure 1B:
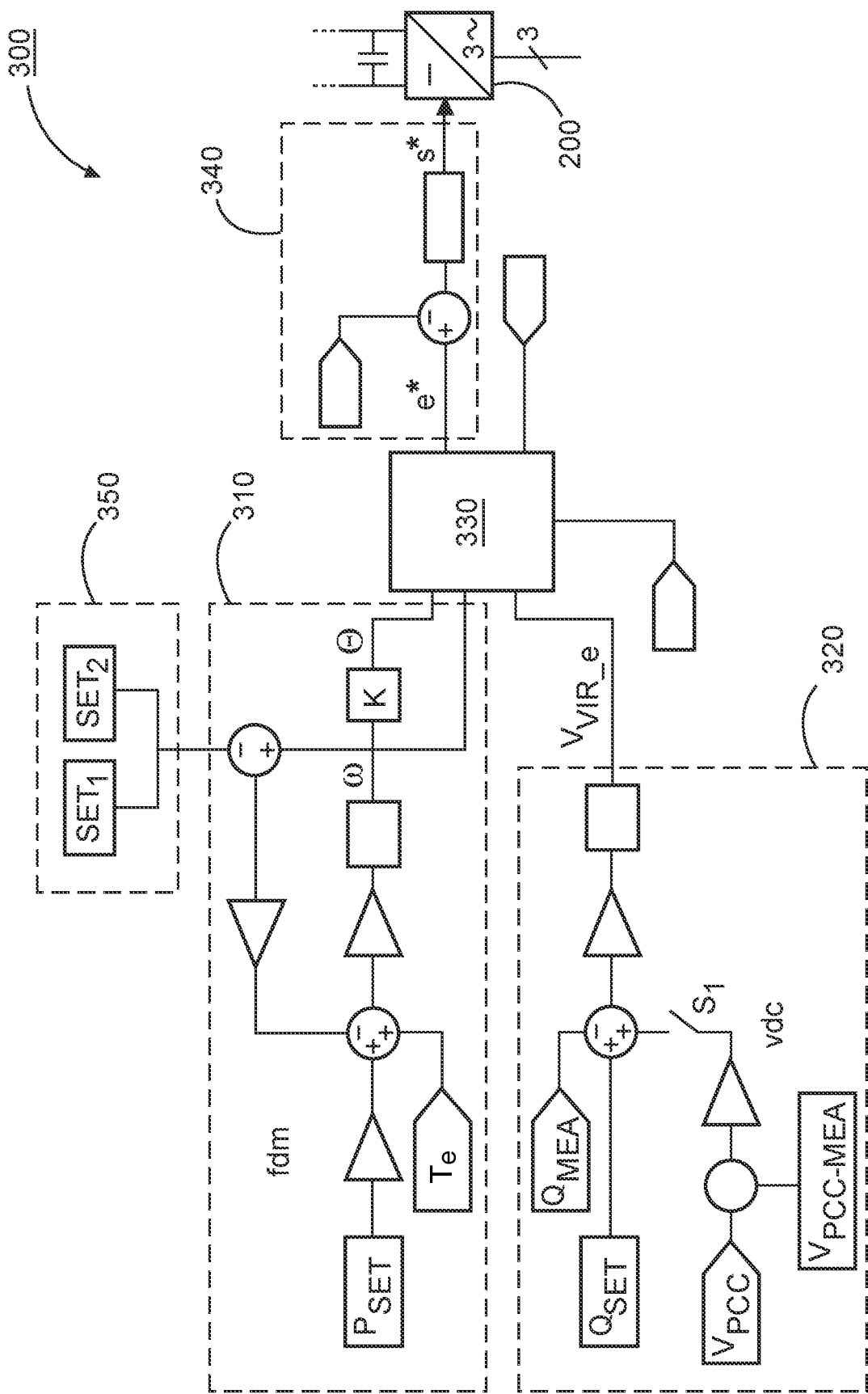
FIG. 1B schematically shows the control unit of a virtual synchronous machine.

FIG. 1B schematically shows the control unit 300 of a virtual synchronous machine.

By means of this control unit 300, the converter 200 of the wind power installation 100, as shown in FIG. 1A, for example, can be controlled in such a way that the converter 200 emulates the behavior of a synchronous machine.

For this purpose, the control unit 300 comprises an active power control 310, a reactive power control 320, a processing unit (processor) 330, a current control 340 and a set point setting 350.

The active power control 310 is set up to calculate an angular velocity ω and an internal reference angle Θ from this from an active power set point P_set, in particular for the converter, which is specified by a wind power installation control, for example.

For this purpose, the active power set point P_set is firstly offset against an actual generator torque T_e and an angular velocity ω is determined from this with the aid of a frequency droop mechanism fdm.

The internal reference angle Θ is then determined for the virtual synchronous machine from the angular velocity ω using an amplification k.

The internal reference angle Θ then serves as an input variable for the processing unit 330.

The reactive power control 320 is set up to calculate a virtual excitation voltage v_vir_e from a reactive power set point Q_set, in particular for the converter, which is specified by a wind power installation control, for example, and a detected reactive power Q_mea, which virtual excitation voltage serves as an input variable for the processing unit 330.

In addition, a voltage control vdc is provided inside the reactive power control, which voltage control compares a voltage V_PCC_mea detected at the converter output with a voltage target specification V_PCC and can be connected by means of the switch S1.

The processing unit 330 is further set up to calculate a virtual pole wheel voltage e* from a or the virtual excitation voltage v_vir_e, in particular of the reactive power control 320, a or the angular velocity ω and a or the internal reference angle Θ.

Current set points S* are then calculated for the converter from this virtual pole wheel voltage e* by means of the current control 340, for example for a tolerance band method by means of which the converter 200 is controlled.

In further embodiments, further set point settings Set_1, Set_2 can additionally be provided in order to further optimize operation of the virtual synchronous machine.

Figure 2:
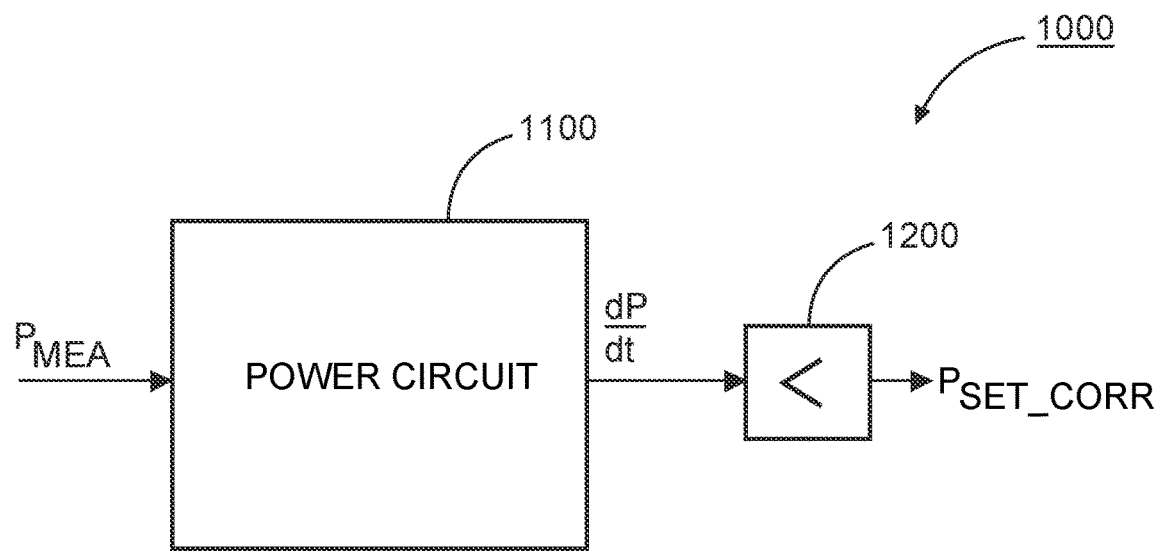
FIG. 2 shows a control module of a converter in an embodiment.

FIG. 2 shows a control module (circuit) 1000 of a converter in an embodiment.

In particular, the control module 1000 is set up to control a converter in such a way that the converter emulates the behavior of a synchronous machine.

The control module comprises a power module (circuit) 1100 and a correction module (circuit) 1200 for this purpose.

The power module 1100 has a detected power, in particular detected at the converter output, as an input variable, in particular an active power P_mea.

As described previously or hereinafter, the power module calculates a power change dP/dt therefrom, in particular depending on the detected power P_mea.

The power change dP/dt calculated in this way is supplied to the correction module 1200.

The correction module 1200 calculates a power set point P_set_corr or directly the power set point P_set for the converter from the power change dP/dt, for example, if the power change dP/dt exceeds a predetermined threshold value, for example.

The control module 1000 therefore preferably only intervenes in the control of the converter, as in FIG. 1B, for example, if a predetermined threshold value is exceeded, which indicates a loss of angular stability.

In such cases, it is then proposed to control a smaller power set point P_set or in particular to set the correction value for the power set point P_set_corr by means of the correction module.

In particular, it is therefore also proposed to reduce the power output of the converter in the event of a loss of angular stability.

Figure 3:
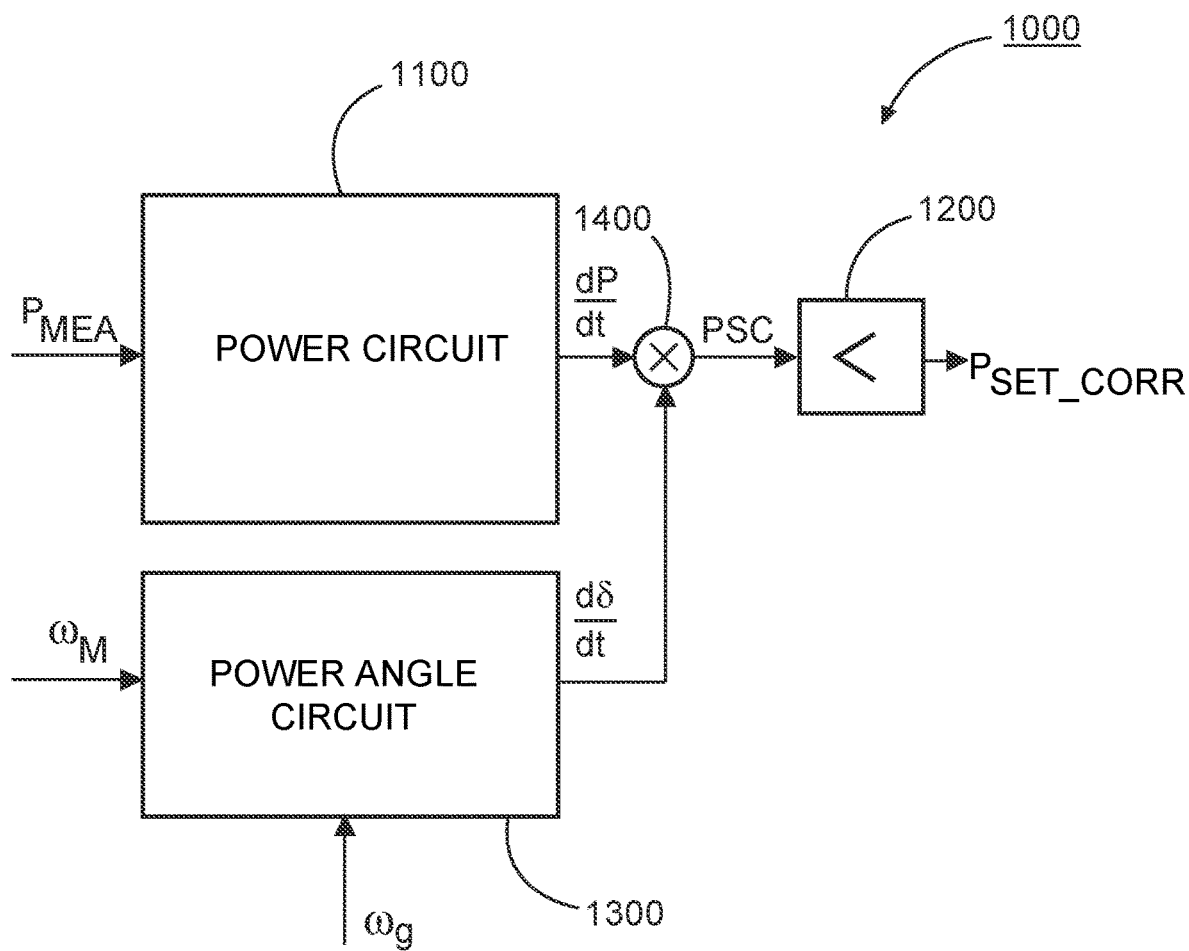
FIG. 3 shows a control module of a converter in a preferred embodiment.

FIG. 3 shows a control module 1000 of a converter, in particular as shown in FIG. 2, in a preferred embodiment.

The control module 1000 additionally has a power angle module (circuit) 1300.

The power angle module 1300 is set up to calculate a power angle change dδ/dt depending on the detected frequencies, in particular the electrical frequency ω_g of the electrical supply network and the electrical frequency ω_m of the virtual synchronous machine.

The power angle change dδ/dt calculated in this way is then multiplied by the power change dP/dt by means of the multiplication, in particular in order to obtain a coefficient PSC which has the same sign as a power synchronizing coefficient. This coefficient can also be described as a change in the power according to the angle, i.e., dP/dδ.

Figure 4:
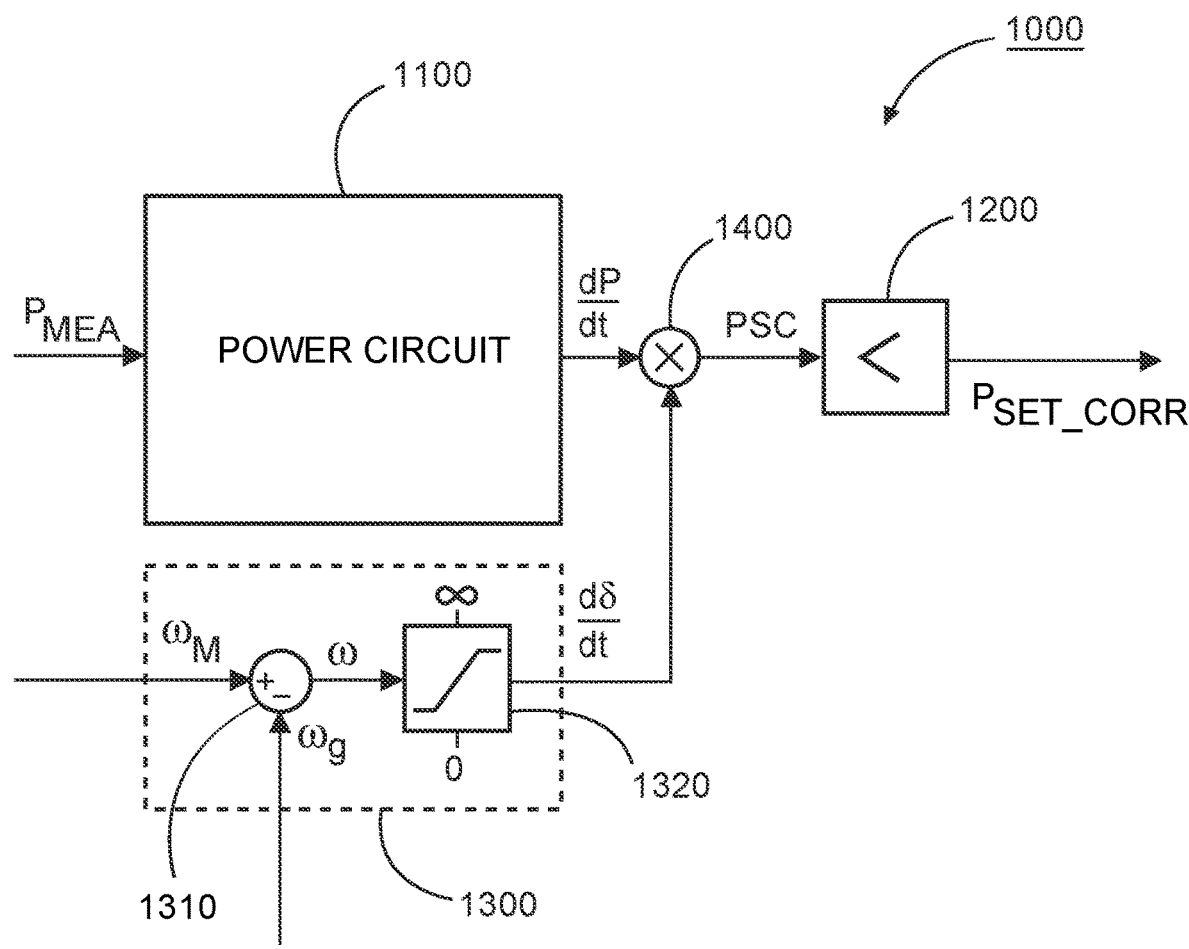
FIG. 4 shows a control module of a converter in a particularly preferred embodiment.

FIG. 4 shows a control module 1000 of a converter, in particular as shown in FIG. 3, in a particularly preferred embodiment.

In this case, the power angle module 1300 has at least one summation (adder/subtractor) 1310 which is set up to compare at least one first electrical frequency ω_g with a second electrical frequency ω_m, in particular in order to calculate a frequency difference (w).

In this case, the first electrical frequency is preferably the electrical frequency of the electrical supply network ω_g and the second electrical frequency the electrical frequency of the virtual synchronous machine ω_m.

In addition, the power angle module 1300 has at least one limiter 1320 which is set up to limit the frequency difference ω to positive values. The limiter therefore preferably operates between 0 and infinity.

In particular, it is therefore also proposed to only consider positive values with regard to the power angle change dδ/dt.

For this purpose, the power angle change dδ/dt is led via a saturation block 1320 or limited to exclusively positive values.

If negative values are therefore present, a zero is output by the limiter or saturation block which results in the product of the power angle change dδ/dt and power change dP/dt also being zero, whereby the threshold value of the correction module is not exceeded and the set points P_set thus do not change, in particular because there is a stable operation.

In particular, it is therefore also proposed that only the situations in which the angle δ accelerates and the power P decreases are identified as a critical state.

Figure 5:
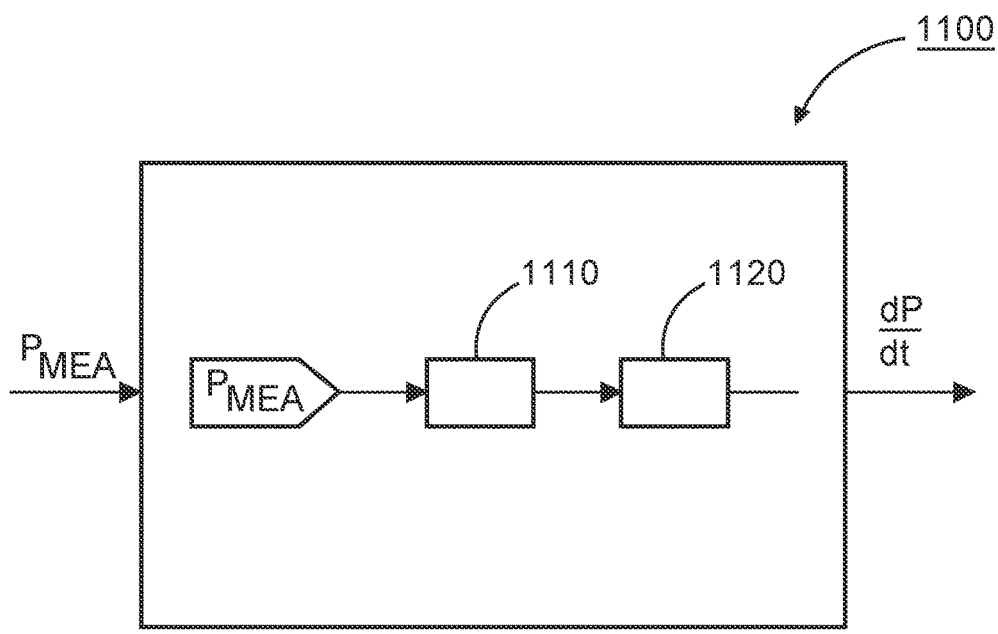
FIG. 5 shows a power module of a control module in a preferred embodiment.

FIG. 5 shows a power module 1100 of a control module 1000, as shown in FIGS. 2 to 4, for example, in a preferred embodiment.

The power module 1100 comprises at least one discrete implementation (discrete processor) 1110 and a discrete filtering 1120.

The power module 1110 is thus set up to calculate a derivative of the power with respect to time from the detected active power P_mea, in particular a power change dP/dt, which is filtered by means of the discrete filtering 1120.

In particular, this means that the power module 1110 is set up to determine the power change dP/dt with respect to time, in particular as a differential.

In particular, a discrete implementation 1110 of the derivative of the measured power P_mea is proposed for determining this power change dP/dt, which implementation cooperates with an additional cascaded discrete filtering 1120.

Figure 6:
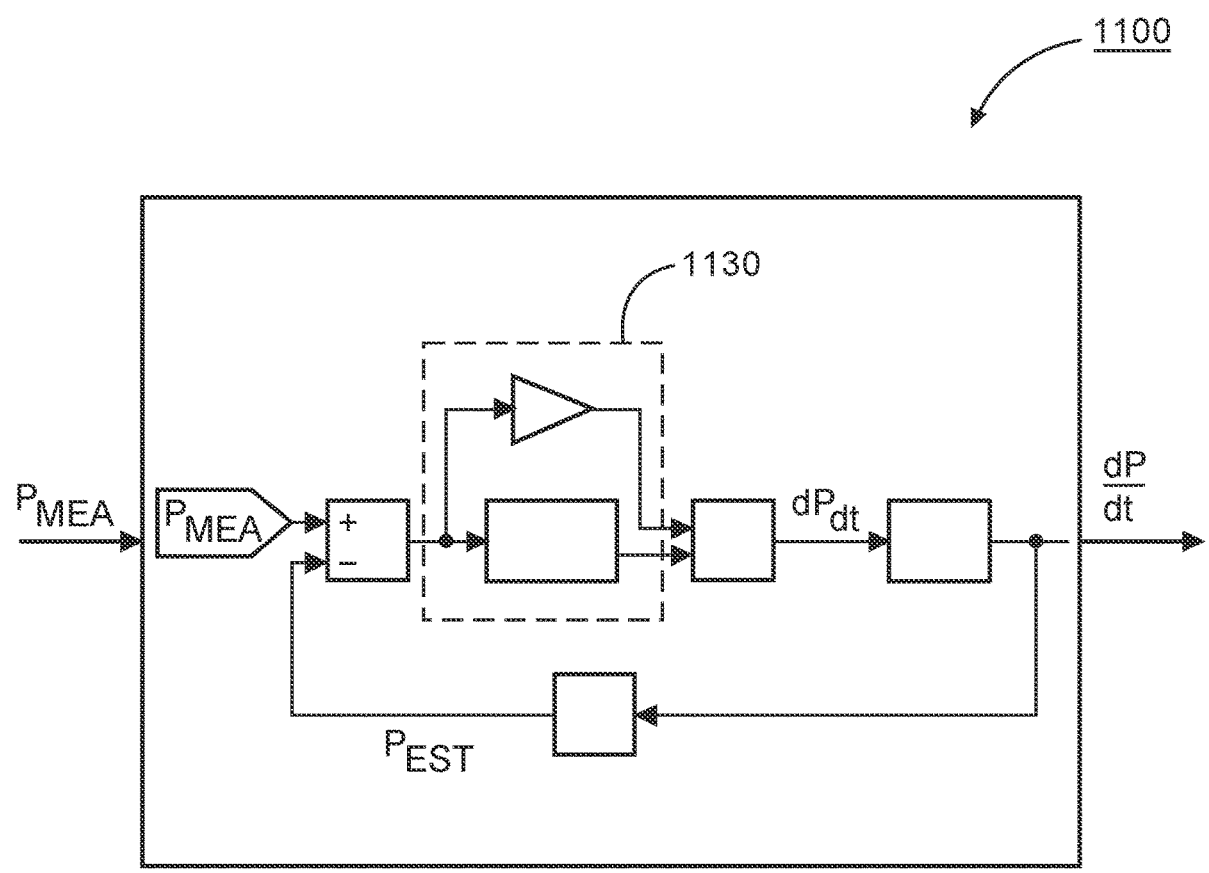
FIG. 6 shows a power module of a control module of a further, preferred embodiment.

FIG. 6 shows a power module 1100 of a control module 1000, as shown in FIGS. 2 to 4, for example, in a further preferred embodiment.

The power module 1100 comprises at least one observer 1130.

The observer can be run by a PI controller, for example, which acts on a difference between the measured power P_mea and an estimated power P_est and calculates a state variable $dP_{dt}$ as a result.

The control module makes it possible to avoid angular instability in the virtual synchronous machine. This can arise, for example, if an error occurs in a line and the equivalent impedance between the converter and the network suddenly increases as a result of switching off the affected line. The result of this is that the set point power can no longer be transmitted due to the physical limits of the system. This, in turn, causes the synchronization with the network to be lost in a virtual synchronous machine (as indeed in a synchronous machine). The control module implements an additional controller which identifies this critical state using available measured values and allows appropriate measures to be taken, such as adjusting the power set point, for example.

LIST OF REFERENCE NUMBERS 100 wind power installation
200 converter, in particular a power converter of a wind power installation
300 control unit of a virtual synchronous machine
310 active power control, in particular for the converter
320 reactive power control, in particular for the converter
330 processing unit, in particular of the virtual synchronous machine
340 current control, in particular for the converter
350 set point setting, in particular for the converter
1000 control module
1100 power module
1110 discrete implementation, in particular of the power module
1120 discrete filtering, in particular of the power module
1130 observer, in particular of the power module
1200 correction module
1300 power angle module
1310 summation
1320 limiter
1400 multiplication (multiplier)
e* virtual pole wheel voltage
fdm frequency droop mechanism
k amplification
k_tresh predetermined threshold value
P_est estimated active power
P_mea detected active power
P_set power set point, in particular for the wind power installation
P_set_corr correction value for the power set point, in particular for the wind power installation
P_set active power set point setting, in particular for the converter
PSC coefficient or product
Q_set reactive power set point setting, in particular for the converter
Q_mea detected reactive power
S1 switch
S* current set points, in particular for the converter
Set_1 first further set point setting
Set_2 second further set point setting
T_e actual generator torque
V_PCC voltage target specification, in particular for the converter, at the converter output
V_PCC_mea voltage detected at the converter output
v_vir_e virtual excitation voltage, in particular virtual excitation voltage
vdc voltage control, in particular voltage droop control
$\omega\_g$ electrical frequency of the electrical supply network
$\omega\_m$ electrical frequency of the virtual synchronous machine
dP/dt power change, in particular power change with respect to time
d$\delta$/dt power angle change, in particular power angle change with respect to time The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit of a converter,
wherein the control circuit is configured to control the converter to cause the converter to emulate a synchronous machine, and
wherein the control circuit comprises:
a power circuit configured to determine a power change depending on a detected power;
a power angle circuit configured to determine a power angle change depending on at least one detected frequency;
a multiplier configured to multiply the power change and the power angle change to form a coefficient; and
a correction circuit configured to set a power set point for the converter depending on the power change, the power angle change and the coefficient.

2. The control circuit as claimed in claim 1, wherein the converter is a power converter of a wind power installation.

3. The control circuit as claimed in claim 1, wherein the power angle circuit includes:
a subtractor configured to determine a frequency difference based on comparing at least one first electrical frequency with a second electrical frequency.

4. The control circuit as claimed in claim 3, wherein the power angle circuit includes:
at least one limiter configured to limit the frequency difference to a positive value.

5. The control circuit as claimed in claim 1, wherein the correction circuit is configured to only set the power set point if the coefficient exceeds a predetermined threshold value.

6. The control circuit as claimed in claim 1, wherein the power circuit includes:
at least one discrete processor configured to determine, discretely, numerically or digitally, a derivative of the detected power.

7. The control circuit as claimed in claim 6, wherein the power circuit includes:
at least one discrete filter, coupled to an output of the discrete processor, configured to determine the power change.

8. The control circuit as claimed in claim 1, wherein the power circuit includes:
at least one observer configured to determine the power change.

9. The control circuit as claimed in claim 8, wherein:
the observer is a proportional-integral (PI) controller, and
the observer is configured to determine the power change based on a difference between the detected power and an estimated power that is estimated by the observer.

10. A controller of the converter, comprising:
the control circuit as claimed in claim 1.

11. The controller as claimed in claim 10, wherein the controller controls the converter.

12. The converter as claimed in claim 11, wherein the controller is for a virtual synchronous machine.

13. A wind power installation, comprising:
the converter as claimed in claim 11.

14. A method for controlling a power converter of a wind power installation to emulate a synchronous machine, comprising:
detecting a power at an output of the power converter;
calculating a power change depending on the detected power;
determining a power angle change depending on at least one detected frequency;

multiplying the power change and the power angle change to produce a coefficient; and setting a power set point for the power converter depending on the power change, the power angle change and the coefficient.

15. The method for controlling the power converter as claimed in claim 14, wherein the coefficient has the same sign as a synchronizing power coefficient.

16. The method for controlling the power converter as claimed in claim 14, comprising:

determining the power angle change at least by comparing a mechanical frequency and an electrical frequency.

* * * * *